Nov. 20, 1962

A. B. BENSON 3,065,362

SINGLE SHOT MULTIVIBRATOR USING SERIES-RESONANT CROSS-COUPLING FOR RESETTING FIXED TIME INTERVAL AFTER TRIGGERING

Filed Aug. 26, 1959

2 Sheets-Sheet 1

INVENTOR
ALLEN B. BENSON

BY Geoffrey Knight
ATTORNEY

Nov. 20, 1962 A. B. BENSON 3,065,362

SINGLE SHOT MULTIVIBRATOR USING SERIES-RESONANT CROSS-COUPLING FOR RESETTING FIXED TIME INTERVAL AFTER TRIGGERING

Filed Aug. 26, 1959 2 Sheets-Sheet 2

INVENTOR
ALLEN B. BENSON

BY Geoffrey Knight
ATTORNEY

United States Patent Office 3,065,362 Patented Nov. 20, 1962

3,065,362
SINGLE SHOT MULTIVIBRATOR USING SERIES-RESONANT CROSS-COUPLING FOR RESETTING FIXED TIME INTERVAL AFTER TRIGGERING

Allen B. Benson, Poughkeepsie, N.Y., assignor to International Business Machines Corporation, New York, N.Y., a corporation of New York Filed Aug. 26, 1959, Ser. No. 836,048
3 Claims. (Cl. 307—88.5)

This invention relates to means for generating, at a rapid rate, uniform output pulses of an extremely accurate shape and duration, independent of the duration of the input trigger pulses.

A conventional single shot multivibrator combines a two stage amplifier and a feedback circuit. The output pulses may be derived from the output of the second stage. One way of obtaining the desired switching action is to couple the stages through a capacitor and make the feedback circuit resistive. A short trigger pulse will cause an output from the first stage which starts to charge the coupling capacitor. An output from the second stage will result as long as the capacitor continues to charge; for, though capacitors cannot pass a voltage level, they can pass voltage changes. The output from the second stage, which is a constant level if the stage is driven to saturation, is connected through the feedback resistor to the input of the first stage. This completes a feedback loop which maintains an input to the first stage until the interstage coupling capacitor has fully charged. When this occurs the second stage output drops back to its initial state. The feedback circuit then no longer maintains an input to the first stage, and both stages return to their original conditions.

The output from the second stage may last for a period which is much longer or shorter than the input trigger pulse. The duration of this output pulse is determined by the value of the coupling capacitor, the resistance of its charging circuit, the supply potentials, circuit parameters and the time elapsed since the last output pulse. Variations in the supply potentials, in circuit parameters, or in the time between trigger pulses may cause changes in the duration and shape of the output pulse. These changes are objectionable in circuits where accuracy is of extreme importance. For example, small changes in pulse width can be particularly undesirable in high speed digital computers.

The novel circuit of this invention uses one transistor for each of the two amplifier stages of the single shot multivibrator. A transistor is a variable impedance, or signal translating, device. The feedback circuit is resistive, and the stages are coupled by a series resonant circuit. The frequency of oscillation of the series resonant circuit is determined by the value of its reactive elements and is independent of supply voltages and circuit parameters. A trigger pulse will cause the circuit to start oscillating at an accurately fixed frequency. Single shot switching action may be obtained by choosing the circuit components so that the first half-period of oscillation will drive the second transistor stage into conduction. The resistive feedback circuit to the first stage will then maintain oscillation until the beginning of the second half period. A full cycle of oscillation never occurs. When the sinusoidally varying current in the series resonant circuit returns to its initial value, the second transistor stage will become non-conductive, and open the feedback loop, stopping oscillation.

When a series resonant circuit is used to couple the two transistors, a trigger pulse will cause the current in the circuit to vary from its quiescent state in a sinusoidal manner. The current returns to the quiescent value a fixed time after leaving it. However, the output pulse from the second stage transistor will not have the desired rectangular shape. This is because the second stage transistor is partially conductive for a period extending from the time the current changes from its quiescent value to the time when it reaches a value sufficient to fully change the conductive state of the transistor. Similarly, prior to the return of the current to its quiescent state, it passes through values which put the second stage transistor into partial conduction. The effect is to prevent the output pulse from having vertical sides. These "turn on" and "turn off" delays reduce the usefulness of the output pulse. If the capacitor in the resonant circuit is given effect a finite time after the current changes from its quiescent value at the beginning of the first half cycle of oscillation, the turn-on point of the second stage transistor is reached more rapidly than if the capacitor had been in the circuit initially. Also, if the effect of the capacitor is removed from the resonant circuit at a finite time before the current again reaches its quiescent value at the end of the first half cycle of oscillation, the cut-off point of the second stage transistor is more rapidly reached, than if the capacitor had been left in the circuit. As a result, the second stage transistor passes through the region of partial conductivity rapidly, optimizing the rectangularity of the output pulse by making its sides substantially vertical.

An important measure of the quality of a single shot multivibrator is the "pulse repetition rate": how soon after the end of an output pulse a new output pulse may be generated. This time interval is partially determined by the discharge time of the capacitor in the series resonant circuit. The accuracy made possible by the use of a series resonant circuit would be nullified if the output pulse width depended upon the time elapsed since the last output pulse. The discharge time is greatly decreased by removing the effect of the capacitor at the end of the first half cycle of oscillation.

Accordingly, amongst the objects of my invention are the following:

To provide a novel circuit which produces a rectangular output pulse of accurately controlled width in response to a trigger pulse.

To provide a single shot multivibrator for producing a rectangular pulse of accurately controlled width unaffected by circuit parameters or supply potential.

To improve the rectangular shape of the output pulse of a single shot multivibrator, and, furthermore to accomplish this employing a series resonant circuit, by providing means for controlling the effect of one element of the resonant circuit at the times that the transistor from which the output pulse is derived is in partial conduction.

To increase the repetition rate of a single shot multivibrator employing a series resonant circuit, by providing means for decreasing the discharge time of the capacitive element near the end of the first half cycle of oscillation.

The foregoing and other objects, features and advantages of the invention will be apparent from the following more particular description of a preferred embodiment of the invention, as illustrated in the accompanying drawings.

Figure 1:
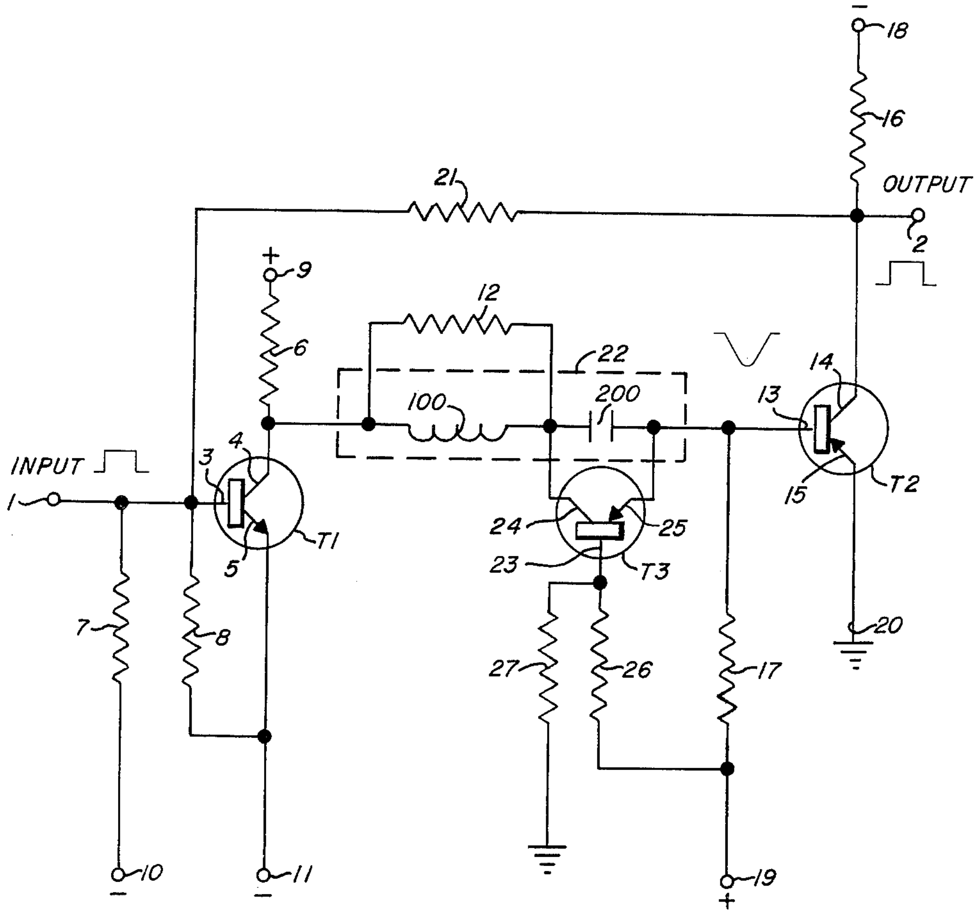
FIG. 1 is a schematic diagram of one embodiment of my invention.

Referring to FIG. 1, the circuit of one embodiment of my invention has an input 1 for trigger pulses and an output 2 for supplying rectangular pulses of fixed duration. Input transistor T1, of the NPN type, comprises a base 3, a collector 4 and an emitter 5. The correct operating biases for transistor T1 are supplied through resistors 6, 7 and 8 by potential sources 9, 10 and 11.

The bias for emitter 5 may be supplied directly from source 11. The exact values of the resistors and potential sources for T1 depend upon the choice of transistors made. The polarities of the potentials 9, 10 and 11 indicated in FIG. 1 are for illustration only. The input 1 is conected to the base 3.

Driving transistor T2, of the PNP type, comprises a base 13, a collector 14 and an emitter 15. The correct operating biases for transistor T2 are supplied through resistors 16 and 17 by potential sources 18 and 19. The emitter 15 is connected to ground 20. The exact values of the resistors and potential sources for transistor T2 depend upon the choice of transistors made. Transistor T2 is shown to be of the PNP type, while transistor T1 is of the NPN type. However opposite types may be used for transistors T1 and T2 if the biases are properly chosen.

The collector 14 of transistor T2 is connected to the base 3 of transistor T1 through feed back resistor 21 in order to maintain transistor T1 conductive whenever transistor T2 is conductive. The base 13 of transistor T2 is connected to the collector 4 of transistor T1 through a series resonant circuit 22, comprising an inductor 100 and a capacitor 200. Resistor 12 which shunts inductor 100 is necessary only if the reactance of the inductor 100 is too large to pass sufficient current to drive transistor T2. Resistor 12 also serves to damp the series resonant circuit 22.

Inductor 100 has a positive reactance and capacitor 200 has a negative reactance. Positive inductive reactance increases as the frequency of variation of a current passed through an inductor increases. Negative capacitive reactance decreases as the frequency of variation of a current passed through a capacitor increases. If a capacitor (C) and an inductor (L) are connected in series to a current source, at some frequency of current variation the sum of the positive inductive reactance and the negative capacitive reactance will be zero. This point is called the resonant frequency, and is equal to $$\frac{1}{2\pi\sqrt{LC}}$$

Maximum coupling between collector 4 of transistor T1 and base 13 of transistor T2 occurs when the current in the series resonant circuit 22 varies at a particular frequency determined by the values of inductor 100 and capacitor 200. At all other frequencies the coupling is through a high reactance, which greatly minimizes the magnitude of the current which can flow from transistor T1 to transistor T2 through the series resonant circuit 22. Therefore, the frequency of operation of the invention may be accurately predetermined, and is independent of variations in supply voltages and circuit parameters.

Switching transistor T3 of the PNP type, comprises a base 23, a collector 24 and an emitter 25. The collector-emitter path of transistor T3 is shunted by capacitor 200. The correct operating biases for transistor T3 are supplied through resistors 6, 17, 26, and 27 by potential sources 9 and 19. Resistor 27 is connected to ground 20. The exact values of the resistors and potential sources for transistor T3 depend upon the choice of transistors made.

The operation of my invention may be shown, by way of example, by referring to the embodiment shown in FIG. 1 and the series of wave forms shown in FIG. 2. In the initial state, NPN transistor T1 is held non-conductive by the difference between potential sources 11 and 10 which keep base 3 more negative than emitter 5. PNP transistor T2 is held non-conductive by the potential source 19 which keeps base 13 more positive than emitter 15 which is connected to ground 20. PNP transistor T3 is held conductive by the potential source 19 which keeps base 23 more negative than emitter 25.

At time $t_0$ a positive trigger pulse appears at the input 1 and is applied to the base 3 of transistor T1 to drive it into the conductive state. As a result, collector 4 changes from a positive polarity to a negative polarity, relative to ground 20. This change cannot be transmitted instantaneously to transistor T2 because of the presence of the series resonant circuit 22 in the path coupling the collector 4 and base 13. The current in the coupling circuit would, in the absence of transistor T3, follow the sinusoidal curve A1 shown in FIG. 2*a*. The initial, or quiescent, current is indicated as $i_{bias}$ since its value is determined by the biases applied to transistors T1, T2 and T3. $i_{bias}$ may be positive, negative or zero. The sinusoidal current A1 reaches the value $i_a$, necessary to turn transistor T2 entirely "on," at time $t_b$. Therefore, there is a delay $t_b$ between the time of initiation of the current variation A1 and the complete conduction of transistor T2. This delay causes the output pulse B1 shown in FIG. 2*b* to have a leading edge which is not vertical.

Figures 2A, 2B, 2C:
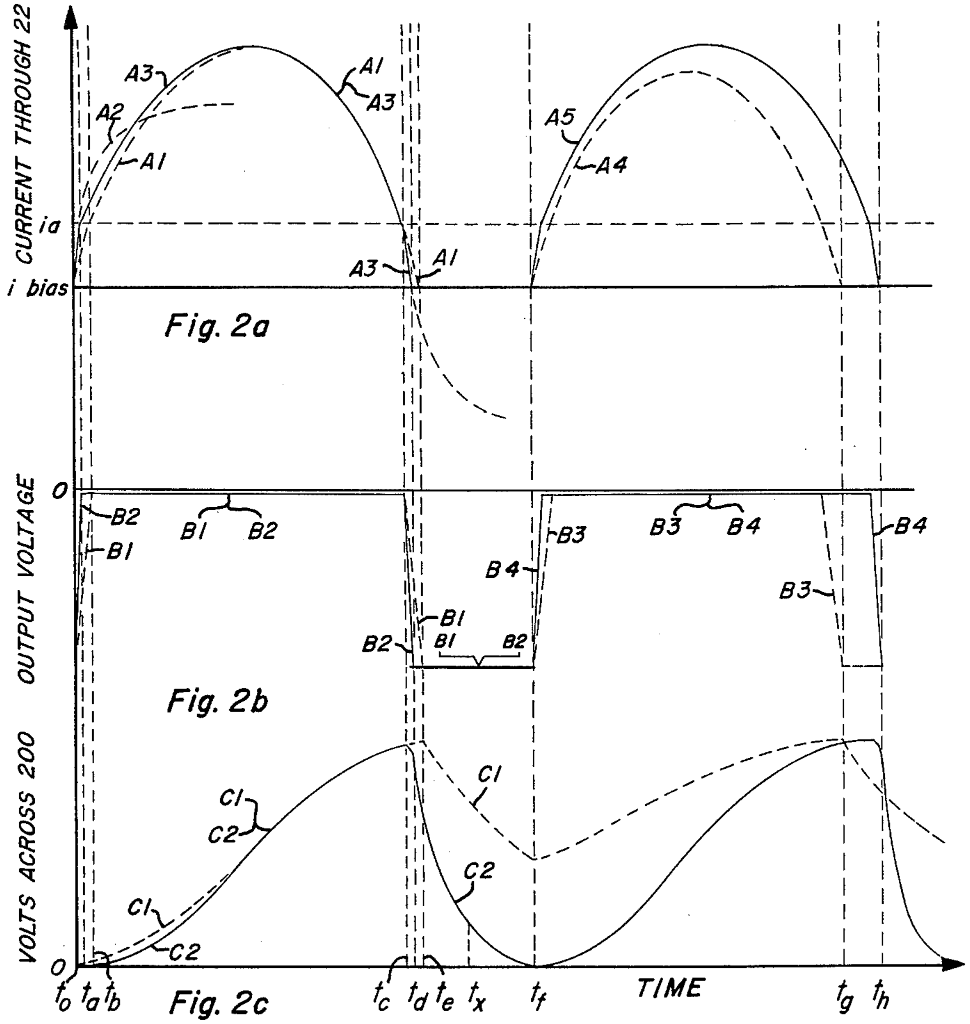
FIG. 2 is a chart showing a series of wave forms to aid in explaining the operation of the circuit in FIG. 1.

In the embodiment shown in FIG. 1 the delay is reduced from $t_b$ to $t_a$ giving the improved output pulse B2 shown in FIG. 2*b*. Transistor T3 is biased to be driven entirely "off" (out of conduction, by the same current $i_a$ that drives transistor T2 entirely "on" (into saturation). This means capacitor 200 of the series resonant circuit 22 is not completely placed into the circuit unit time $t_a$, due to the low resistance bypass around capacitor 200 provided by transistor T3 until it is biased "off." As a result, the current flowing to base 13 of transistor T2 rises exponentially from the time $t_0$ to time $t_a$, instead of sinusoidally. In FIG. 2*a*, exponential curve A2 shows that sufficient current $i_a$ flows to the base 13 at time $t_a$ to drive it entirely "on." Suppression of the effect of capacitor 200 decreases the time necessary to reach the current $i_a$ because the time constant of the circuit through which the current flows is substantially reduced, if the resistance (R) in series with the inductor 100 is large. Whereas in a series resonant circuit 63.2% of the maximum current is reached in a time equal to $1.37\sqrt{LC}$, this same current is reached in a time equal to $L/R$, when the capacitor is removed. There is an improvement in the rise time of the current as long as the following relationship holds true:

$$1.37\sqrt{LC}>\frac{L}{R}$$

At time $t_a$, when the current $i_a$ turns transistor T2 entirely "on," the transistor T3 is turned entirely "off." One way of understanding this is to view each transistor T2 and T3 as being driven fully into the conductive or nonconductive state by the same voltage drop across resistor 17. Both transistors T2 and T3 are of the PNP type. Therefore, when the current reaches the value $i_a$ the voltage drop across resistor 17 is negative enough to entirely cut off transistor T3 by making its emitter 25 more negative than its base 23, and, to entirely turn on transistor T2 by making its base 13 more negative than its emitter 15. Once transistor T3 is entirely "off," the capacitor 200 is part of the series resonant circuit 22, which causes the current to change sinusoidally beginning from time $t_a$, as shown by curve A3 in FIG. 2*a*.

Full conduction of transistor T2 causes the potential at the output 2 to change from a negative potential to ground potential 20, as shown by the leading edge B2 in FIG. 2*b*. This potential is applied to base 3 of transistor T1, through feedback resistor 21, in order to maintain transistor T1 conductive even if the original trigger pulse is no longer present at input 1. Transistor T1 will remain conductive as long as transistor T2 keeps base 3 of transistor T1 more positive than emitter 5. This action may be enhanced by providing means for non-invertive amplification in the circuit between collector 14 and base 3.

After an accurately predetermined time $t_c$, fixed by the value of the inductor 100 and capacitor 200, the sinusoidal current A3 through the series resonant circuit 22 will again reach the value $i_a$, as shown in FIG. 2*a*. This current causes a voltage drop across resistor 17 which is of such a polarity that transistor T3 is driven towards conduction, whereas transistor T2 is made less conductive. As transistor T2 is made less conductive, the increasingly negative potential applied to transistor T1, through feedback resistor 21, makes transistor T1 less conductive.

When the current reaches its quiescent value, indicated in FIG. 2*a* as $i_{bias}$, all the transistors will be driven entirely back to their initial states. In the embodiment shown in FIG. 1, the current $i_{bias}$ is reached at time $t_d$. Without transistor T3, the normally oscillating current would reach the value $i_{bias}$ at a later time $t_e$. It is seen in FIG. 2*b* that the output wave form B2 for the single-shot multivibrator of my invention has edges which are much more vertical than the pulse B1 obtained without transistor T3. This is because the transition point, when transistor T2 is only partially conducting, is passed through very rapidly. When the current reaches the value $i_a$, at time $t_c$, transistor T3 begins to conduct, reducing the effect of capacitor 200 on the series resonant circuit 22. As previously explained, there is an improvement in the rise time of the current due to the effect of transistor T3 on capacitor 200 as long as $1.37\sqrt{LC}$ is larger than $L/R$.

At time $t_d$ transistor T2 is non-conductive, and the output 2 is negative, holding transistor T1 non-conductive. The entire described operation will be repeated upon the application of another trigger pulse. How soon after the end of an output pulse the next trigger pulse will repeat the described operation uniformly is determined by the time necessary for capacitor 200 to discharge. Without transistor T3 the discharge path is through resistors 6 and 17 giving the voltage wave form C1 shown in FIG. 2*c*. If a second trigger pulse occurs at time $t_f$, before the capacitor 200 is substantially discharged, the current will not result in a sinusoid having a time constant determined by inductor 100 and 200. Rather, the time constant will be much shorter as shown by wave form A4 in FIG. 2*a* and B3 in FIG. 2*b*, because the capacitor 200 has some energy initially stored which need not be transferred from the inductor 100 as is usually necessary. This is objectionable because output pulses of uniform duration will not result.

In the circuit of FIG. 1, transistor T3 starts to conduct at time $t_c$ and is fully conducting at time $t_d$. Therefore, at the end of the output pulse, at time $t_d$, the capacitor 200 is shunted by the fully conducting transistor T3. This provides a relatively low resistance discharge path for capacitor 200, causing it to discharge to 36.8% of its fully charged potential by time $t_x$, as shown by curve C2 of FIG. 2*c*. Subsequent trigger pulses will initiate uniform output pulses at any repetition rate less than one pulse per period $t_x - t_0$.

My invention is peculiarly adapted to the use of transistors; however, while the invention has been particularly shown and described with reference to a preferred embodiment thereof, it will be understood by those skilled in the art that various changes in form and details may be made therein without departing from the spirit and scope of the invention.

I claim:

1. In a pulse generator for generating a pulse of a fixed duration independent of the input pulse duration: a first transistor; means for applying an input pulse to said first transistor to make it conductive; a second transistor; means for connecting the output of said second transistor to maintain said first transistor conductive; series resonant means comprising elements having reactances of opposite polarity for connecting the output of said first transistor to the input of said second transistor; a third transistor connected across one of the reactive elements of said series resonant means so that whenever said third transistor is partially conductive it controls the effect of the one of said elements across which it is connected, thereby causing the second transistor and first transistor to rapidly change their states; and means for rendering said third transistor conductive in dependence upon conduction in said first transistor.

2. A monostable multivibrator, comprising: first and second variable conduction means, each operable to generate an output signal in response to an applied signal; feedback means for maintaining said first variable conduction means conducting in response to conduction of said second variable conduction means; series resonant means for causing said second variable conduction means to conduct for a duration of time in response to the conduction of said first variable conduction means, said time determined by the characteristics of said series resonant means, said series resonant means including elements of opposite reactance; control means for altering the operation of one of said elements in response to conduction of one of said variable conduction means; and input means for initiating conduction of said first variable conduction means.

3. A monostable multivibrator, comprising: first and second variable conduction means, each operable to generate an output signal in response to an applied signal; feedback means for maintaining said first variable conduction means conducting in response to conduction of said second variable conduction means; resonant means, including elements of opposite reactance, said resonant means coupling the output of said first variable conduction means to the input of said second variable conduction means, for causing said second variable conduction means to conduct for a duration of time in response to excitation of said resonant means by the output of said first variable conduction means, said time being determined by the characteristics of said resonant means; third variable conduction means shunting one of said elements of opposite reactance; means for maintaining said third variable conduction means conductive until said second variable conduction means is fully conductive; and input means for initiating conduction of said first variable conduction means.

References Cited in the file of this patent

UNITED STATES PATENTS

| | | |
|---|---|---|
| 2,807,719 | Cattermole | Sept. 24, 1957 |
| 2,897,378 | Jones | July 28, 1959 |
| 2,952,784 | Carr | Sept. 13, 1960 |

UNITED STATES PATENT OFFICE

CERTIFICATE OF CORRECTION

Patent No. 3,065,362 November 20, 1962

Allen B. Benson

It is hereby certified that error appears in the above numbered patent requiring correction and that the said Letters Patent should read as corrected below.

Column 4, line 22, after "conduction" insert a closing parenthesis; line 24, after "means" insert -- that --; line 25, for "unit" read -- until --.

Signed and sealed this 16th day of July 1963.

(SEAL)
Attest:

ERNEST W. SWIDER
Attesting Officer

DAVID L. LADD
Commissioner of Patents